United States Patent [19]

Akin et al.

[11] Patent Number: 5,033,196
[45] Date of Patent: Jul. 23, 1991

[54] TRI-DIRECTIONAL TOOL HOLDER

[75] Inventors: Mickey E. Akin; Benny E. Agan, both of Bremen, Ga.; James O. Lowery, Ranburne, Ala.

[73] Assignee: Southwire Company, Carrollton, Ga.

[21] Appl. No.: 489,402

[22] Filed: Mar. 6, 1990

[51] Int. Cl.5 .................... B43L 13/00; B41F 17/00
[52] U.S. Cl. ................................. 33/18.1; 101/35; 33/572; 248/904
[58] Field of Search .............. 33/18.1, 1 M, 1 MP, 33/644, 645, 679, 572, 503, 516, 21.3, 562, 516, 622; 248/276, 279, 287, 904, 124, 452; 901/16, 41–43; 101/35

[56] References Cited

U.S. PATENT DOCUMENTS

| | | | |
|---|---|---|---|
| 2,859,522 | 11/1958 | Thomas | 33/21.3 |
| 2,899,890 | 8/1959 | Farkas | 101/35 |
| 3,867,882 | 2/1975 | Ahlgren | 101/35 |
| 3,960,072 | 6/1976 | Ahlgren | 101/35 |
| 4,485,453 | 11/1984 | Taylor | 33/61.3 X |
| 4,800,651 | 1/1989 | Hanlon | 33/203.15 X |
| 4,843,958 | 7/1989 | Egosi | 101/35 |

FOREIGN PATENT DOCUMENTS 1165114   5/1958   France .......................... 33/678

Primary Examiner—Harry N. Haroian
Attorney, Agent, or Firm—Stanely L. Tate; James W. Wallis, Jr.

[57] ABSTRACT

Apparatus for providing adjustment along three perpendicular axes such that a marking head can be properly and precisely positioned for applying identifying markings to boxes or containers of various sizes, the positioning being accomplished without the use of tools or special mechanical skills.

5 Claims, 1 Drawing Sheet

TRI-DIRECTIONAL TOOL HOLDER

TECHNICAL FIELD

This invention relates to an improved method and apparatus for positioning an identifying mark on a box. More particularly, this invention relates to a method and apparatus for positioning a printer head such that the identifying mark applied to a box or container by such printer head can be properly positioned for various sizes and shapes of containers.

BACKGROUND ART

In the manufacture of wire and cable products, such products are generally fabricated in long substantially continuous lengths which are intermediately placed on large reels. The product is subsequently cut into shorter lengths and packaged in craft or corrugated paper boxes or containers for distribution to the ultimate user. Since the products being packaged vary in both diameter and length, containers of many different sizes are utilized. It is also normal industry practice to mark these containers with markers to identify the containers' contents immediately after a product is packaged. This substantially continuous process occurs as containers pass a marking station immediately after they are filled. Modern packaging and inventorying methods typically require the use of coded labels on containers or boxes when automated handling and storage systems are used. These label codes are read by machines which scan selected areas of a container surface and react to the data found thereon directing the machine to store or retrieve the containers. Problems stem from the fact that many different sizes of boxes or containers are used. Since a reader or scanner must read a clear and uncluttered image, the label or identifying mark must be properly located on the face of a box in an otherwise unmarked area. The use of both large and small boxes which constantly pass a marking station typically requires frequent adjustment of a printer head in order for such marker to apply the identifying markings to an unmarked area on the surface of a given box size and configuration. Since the boxes used to package various products differ greatly in size and markings, the placement of the identifying mark on the boxes is not constant from product to product. It is therefore desirable to be able to move and align the head that applies the identifying markings onto the boxes or containers when the box configuration changes, without having to use specialized tools and equipment or to call on specially developed mechanical skills. Prior to the present invention, no such method or device existed in the market place.

Heretofore, properly aligning the identification markings on a box or container required complicated adjustments of the marking head. These adjustments required the use of many tools and also required a significant degree of skill on the part of an operator or mechanic to properly adjust the marking equipment such that the identifying codes being applied t the above described boxes and containers were properly placed. The marking machine had to be painstakingly "set up" for each size and configuration of container to be marked and the process had to be repeated whenever a container size changed and the previously set position for the mark no longer worked. This adjustment process required the packaging machine as well as the marking machine to be idle while such adjustments were made. The resulting downtime reduced the capacity for filling and marking the boxes or containers and correspondingly increased the cost of operation.

DISCLOSURE OF THE INVENTION

It is therefore a primary object of the present invention to provide an improved method and apparatus for positioning bar codes or other identifying markings being applied to a carton or container.

It is a further object of the present invention to provide an improved method and apparatus for positioning a marking head such that an identifying mark placed on a box or container by such head can be accurately positioned on a carton or container where the mark can be located and scanned by code reading equipment.

It is a further object of the present invention to provide an improve method and apparatus for positioning a marking head used to apply an identifying mark to a carton or container without the necessity of using tools or special mechanical skills.

A primary feature of the present invention is an apparatus which accurately and simply positions a marking head such that an identifying mark applied by such a head can be properly positioned on the face of a box or container where it can be read by automatic handling systems.

Another feature of the present invention is that the apparatus of the invention can be adjusted for positioning a marking head attached thereto without the need for tools or special mechanical skills.

Another feature of the present invention is its simplicity and the low cost of its manufacture.

An advantage of the present invention is that the apparatus can be used to accurately position a marking head so that the identifying mark placed by such head is properly positioned to be read by automatic reading and handling equipment.

Another advantage of the present invention is that a head used for applying an identifying mark to a package or container can be easily adjusted without using tools and without requiring any special degree of mechanical skills.

Another advantage of the present invention is its ease of use and the absence of a need for extensive training of operators and mechanics who will be using the invention.

In accordance with these and other objects, features and advantages, there is provided a method and apparatus for positioning the head of a marking machine such that an identifying mark can be placed, by such machine, on a box or container in a predetermined and proper location without requiring the use of tools or any special mechanical skills.

In accordance with the present invention, the apparatus comprises means for adjusting a marking head in each of three directions, i.e. along the X, Y, and Z axes, so that such head is properly positioned for applying an identifying mark to a box or container.

The present invention also comprises apparatus for providing adjustments along the X, Y, and Z axes so as to allow the marking head to be properly positioned for applying an identifying mark to a box or container passing thereby without the need of tools or special mechanical skills.

BEST MODE OF CARRYING OUT THE INVENTION

Figure 1:
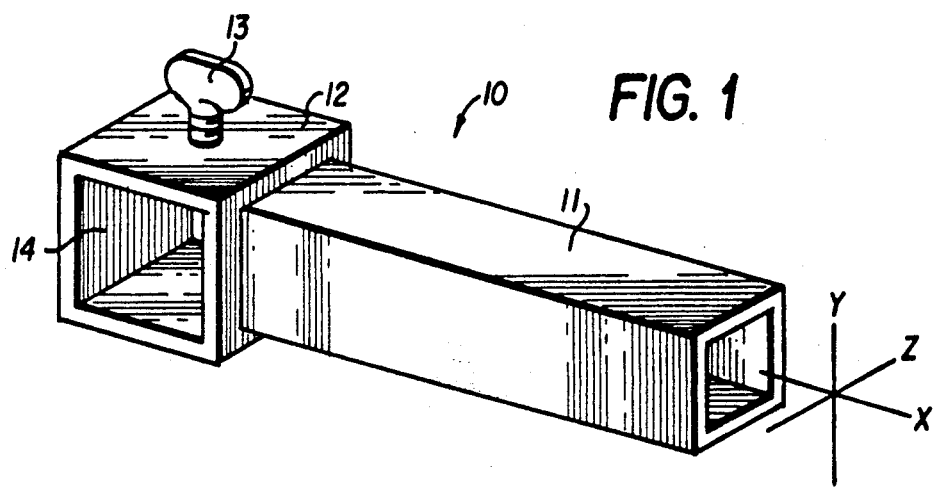
FIG. 1 is a pictorial view of an adjusting member of the present invention.

Refer now to FIG. 1, which is a pictorial view of an adjusting member of the present invention. Adjusting member 10 comprises a square arm member 11 said member 11 having a first and a second end. Attached to said second end of member 11 is housing member 12. Housing member 12 comprises a hollow rectangular body having a through passage 14 said passage 14 being dimensioned such that arm member 11 of an identical adjusting member 10 can be secured within passage 14 by action of set screw 13 acting upon arm member 11. Each adjusting member 10 is substantially identical to each other adjusting member 10 such that a plurality of adjusting members 10 will work in concert each with the other as shown in FIG. 2.

Figure 2:
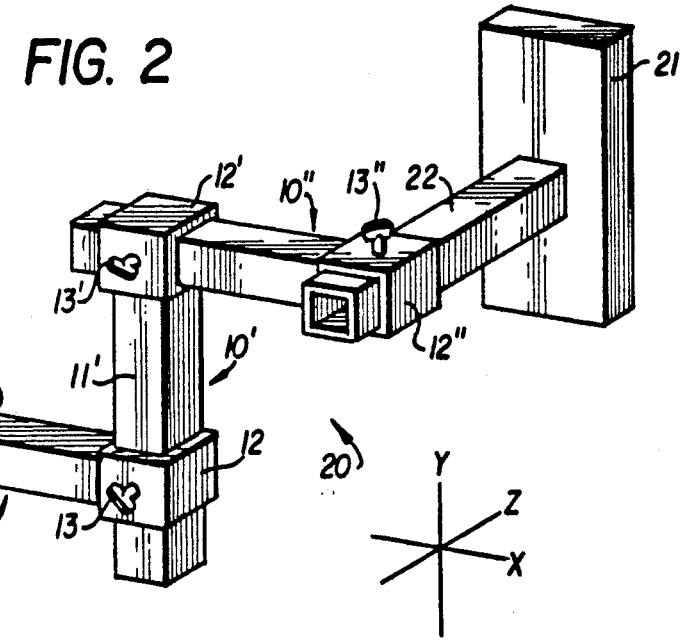
FIG. 2 is a pictorial view of the present invention showing the relative positions of the plurality of adjusting members which provide for three dimensional movement of a printing or marking head.

Refer now to FIG. 2, which is a pictorial view of the present invention showing the relative positions of a plurality of adjusting members 10. The functional portions of adjusting members 10 are substantially identical to those other adjusting members 10, said members being identified 10' and 10".

Said first end of arm member 11 of adjusting member 10 is fixed to anchor member 100. Arm member 11' of adjusting member 10' passes through passage 14 (see FIG. 1) of housing member 12. Arm member 10' is secured within member 12 by set screw 13 which passes through member 12 and secures arm 11'. Likewise, arm member 10" passes through and is secured within member 12' according to the previous description.

By loosening set screw 13 in member 12, adjusting member 10' can be moved within passageway 14 (see FIG. 1) resulting in an adjustment of printer head 21 along the Y axis. Likewise, loosening adjustment screw 13' allows arm member 10" to be moved within passageway 14', said passage being identical to passageway 14 (see FIG. 1) thereby allowing adjustment of printer head 21 along the X axis. In a like manner, loosening set screw 13" allows printer mounting member 22 to slide within passageway 14", said passageway being identical to passageway 14 (see FIG. 1) and allows movement of printer head 21 along the Z axis.

It can be readily seen that adjustments along either the X, Y, or Z axis may be made according to the present invention with simple securing devices 13, 13', 13" acting on arm members 11, 11', 11" of the plurality of adjusting members 10, 10' 10" fixing the position of printer head 21.

Although the invention has been discussed and described with primary emphases on one embodiment, it should be obvious that adaption and modifications can be made without departing from the spirit and scope of the invention.

What is claimed is:

1. An apparatus for adjustably positioning a box marking apparatus along three axes as boxes pass said apparatus comprising:

a) an adjusting means comprising a first arm having a first and second end, said arm fixed to marking apparatus base at its first end and having a holding fixture suitably fixed to its second end, said fixture comprising a rectangular body through which passes a rectangular passageway, said passageway dimensioned such that a second arm can be passed therethrough and said fixture having a securing means for securing said second arm within said passageway;

b) a second arm having a first and second end, said arm being adjustably positioned within said passageway of said holding fixture in said first arm and being secured therein by said securing means in said holding fixture of said first arm, and said second end being suitably fixed to a holding fixture, said fixture comprising a rectangular body through which passes a rectangular passageway, said passageway dimensioned such that a third arm can be passed therethrough and said fixture having a securing means for securing said third arm within said passageway;

c) a third arm having a first and second end, said arm being adjustably positioned within said passageway of said holding fixture of said second arm and being secured therein by said securing means in said holding fixture of said second arm, and said second end being suitably fixed to a holding fixture, said fixture comprising a rectangular body through which passes a rectangular passageway, said passageway dimensioned such that a fourth arm can be passed therethrough and said fixture having a securing means for securing said fourth arm within said passageway; and d) a fourth arm having a first and second end, said arm being adjustably positioned within said passageway of said holding fixture in said third arm and being secured therein by said securing means in said holding fixture of said third arm, and said second end being suitably fixed to said marking apparatus.

2. The apparatus of claim 1, wherein said securing means comprises a threaded member passing through a threaded hold said hole passing through said fixture and entering said passageway in said fixture and said threaded member acting on said arm passing through said passageway securing said arm therein.

3. The apparatus of claim 1, wherein said passageway in said fixture of said first arm is oriented such that the arm secured therein adjusts said marking apparatus along the Y axis, said axis being vertically perpendicular to the direction of movement of boxes being marked as they pass thereby.

4. The apparatus of claim 1, wherein said passageway in said fixture of said second arm is oriented such that the arm secured therein adjusts said marking apparatus along the X axis, said axis being parallel to the direction of movement of boxes being marked as they pass thereby.

5. The apparatus of claim 2, wherein said passageway in said fixture of said third arm is oriented such that the arm secured therein adjusts said marking head along the Z axis, said axis being horizontally perpendicular to the direction of movement of boxes being marked as they pass thereby.

* * * * *